United States Patent [19]

Bolie

[11] 4,116,581
[45] Sep. 26, 1978

[54] SEVERE CLIMATE WINDMILL

[76] Inventor: Victor W. Bolie, 7504 American Heritage NE., Albuquerque, N. Mex. 87109

[21] Appl. No.: 761,398

[22] Filed: Jan. 21, 1977

[51] Int. Cl.² .............................................. F03D 7/00
[52] U.S. Cl. .................................... 415/2; 290/55
[58] Field of Search ................................ 415/2-4, 415/208, 216, 217; 290/43, 44, 54, 55

[56] References Cited

U.S. PATENT DOCUMENTS

| 581,311 | 4/1897 | Scovel et al. | 415/2 |
| 2,616,506 | 11/1952 | Mathias | 415/2 |
| 3,270,656 | 9/1966 | Cook | 415/208 |

FOREIGN PATENT DOCUMENTS

| 529,301 | 11/1921 | France | 415/2 |
| 572,787 | 6/1924 | France | 415/2 |
| 449,753 | 12/1947 | Italy | 415/3 |
| 12,096 of | 1910 | United Kingdom | 415/2 |

Primary Examiner—C. J. Husar
Attorney, Agent, or Firm—Head, Johnson & Chafin

[57] ABSTRACT

A windmill for use in areas having severe climates, comprises a substantially spherical assembly supported above the ground on a plurality of legs. The structure is divided into two hemispheres. The lower hemisphere is rigidly supported by the legs, and the upper hemisphere is adapted to rotate coaxially with respect to the lower hemisphere. One side of the upper hemisphere is cut away to form an air scoop which when directed into the wind causes the wind to flow into the scoop and to be deflected downwardly into the lower hemisphere. The lower hemisphere is truncated at its lower end by a horizontal plane of selected diameter and the wind flowing into the scoop flows vertically outward from the exit opening in the bottom of the lower hemisphere. An axial structure supports a shaft carrying a multi-bladed turbine of selected diameter centered in the exit opening. The shaft is connected to a generator inside of said axial structure. Means are provided for steering the air scoop into the wind.

13 Claims, 6 Drawing Figures

SEVERE CLIMATE WINDMILL

BACKGROUND OF THE INVENTION

1. Field of the Invention

This invention lies in the field of wind driven devices. More particularly it is a special type of windmill having a rotating fan driven by the wind. Still more particularly it is a design of a rotating fan windmill which is substantially spherical in shape so as to be adapted for use and service in areas where the climate is severe, so that there is little damage occasioned by wind, rain, sleet and snow.

2. Description of the Prior Art

The prior art devices generally consist of a large multi-bladed fan mounted on a horizontal axis, which is supported about a vertical axis having means to steer the fan into the wind. The fan is mounted on the top of a very tall structure. All of the prior art devices show a design which is fragile in its turbine blades, particularly under severe weather conditions. The effects of gust loads and icing when added to the inherent stresses of precession and gravity, can readily threaten the structural integrity of the long cantilevered blades. A secondary disadvantage of the conventional windmill configuration is its objectionable visual appearance. These and other disadvantages are overcome by the spherical vertical axis windmill structure of this invention.

SUMMARY OF THE INVENTION

It is the primary object of this invention to provide a large scale windmill capable of withstanding severe weather conditions.

It is a further object of this invention to provide novel means for inducing useful air flow through a vertical axis turbine.

It is a still further object to provide means for advantageously combining the ram effect of a steerable air scoop with the suction effect of an orificed dome.

It is a still further object to provide a windmill structure nearly devoid of flat horizontal surfaces on which snow and/or ice might accumulate.

It is a still further object to provide a large scale windmill structure which is not visually objectionable.

These and other objects are realized and the limitations of the prior art are overcome in this invention, by supporting a vertical axis turbine near the bottom of a hemispheric bowl which is truncated to provide a suitable air exit.

A hemispherical dome is mounted rotatably above the lower hemisphere, so as to rotate coaxially on the lower hemisphere. One side of the upper hemisphere is cut away to form an air scoop. A central axial structure in the form of a tapered cylinder is supported by legs along the axis of the lower hemisphere and includes an axial shaft which projects downwardly to support the fan. The shaft connects to an electrical generator inside the axial structure, and may extend downwardly for other driving purposes. The top of the axial structure provides an axial post about which the upper hemisphere rotates.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figures 1, 2:
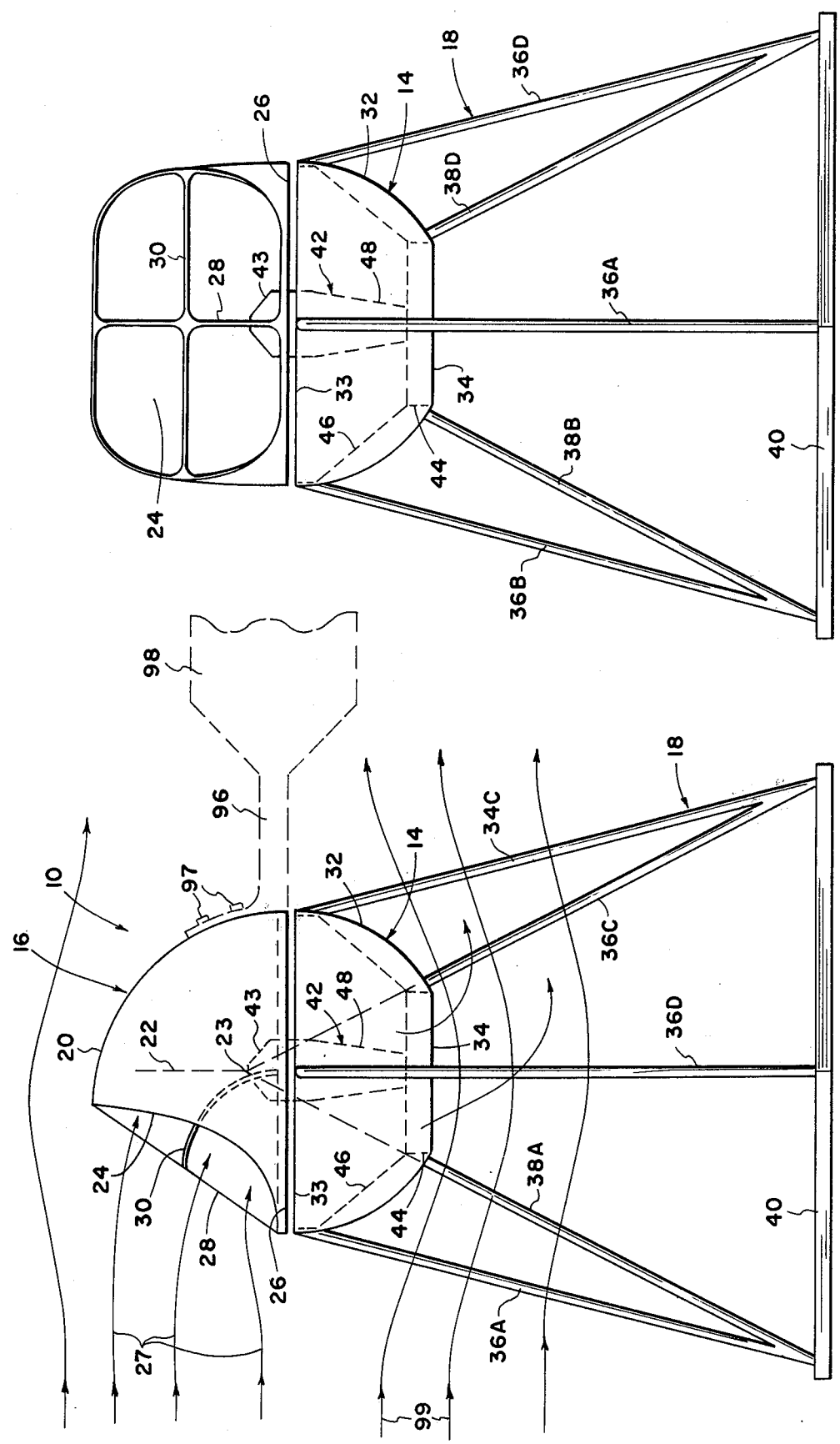
FIGS. 1 and 2 show two vertical elevation views of one embodiment of this invention.
Figure 3:
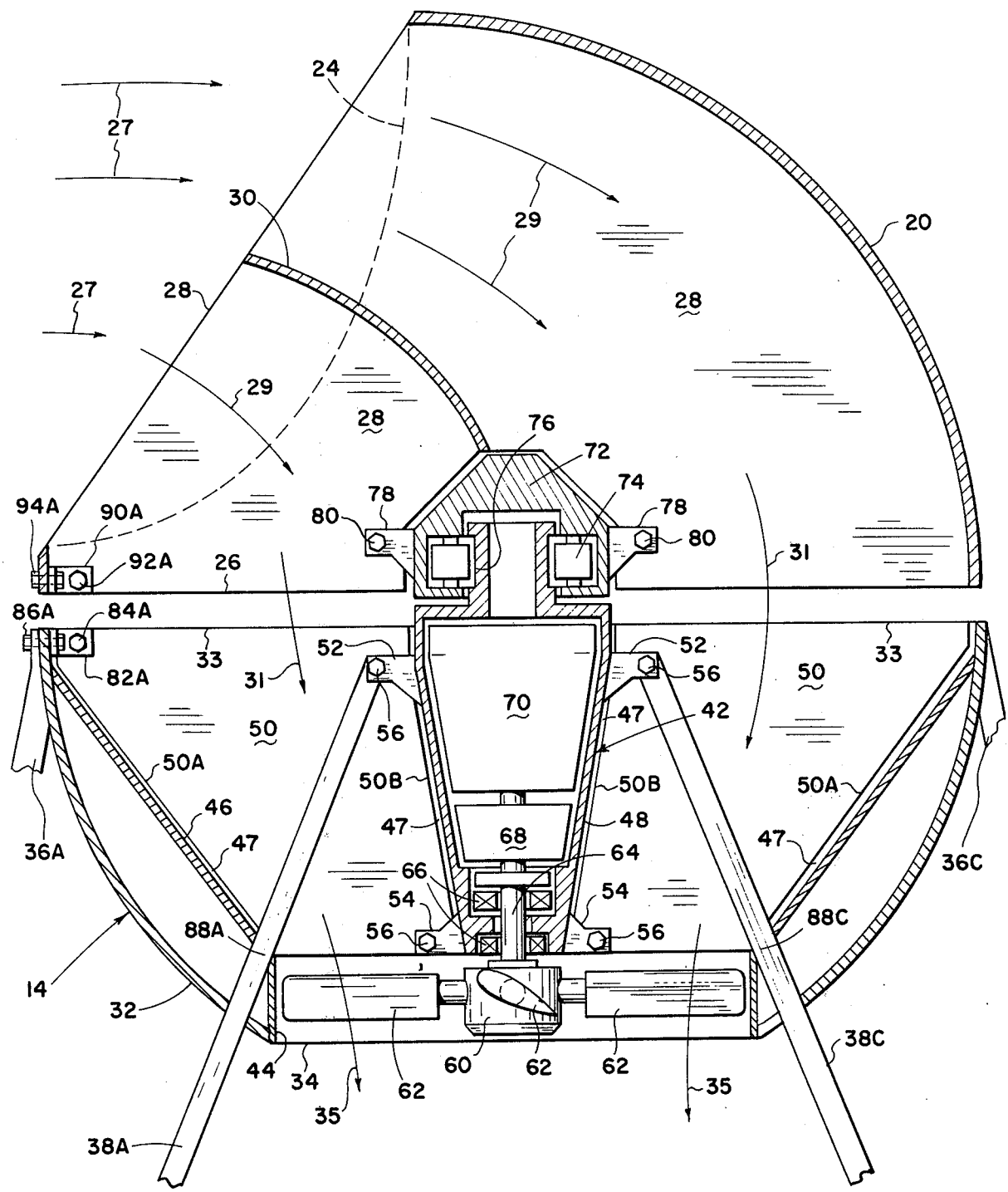
FIG. 3 illustrates in a vertical section, the details of the spherical windmill assembly.

Referring now to the drawings, and in particular to FIGS. 1, 2 and 3, it is seen that exclusive of the turbine wheel itself, the overall structure 10 is comprised of two major parts, an orificed hemispherical bowl indicated generally by the numeral 14, a plurality of support legs 36 and 38, and a steerable hemispherical air scoop indicated generally by the numeral 16. An important principle in the operation of this embodiment is that the air flows into the air scoop and vertically downwardly into the lower hemisphere, through the fan, and out of the exit opening in the bottom.

The lower hemisphere 14 comprises a hemispherical shell 32 bounded above by a horizontally oriented equatorial circle 33 and bounded below by a horizontally oriented axially concentric circular orifice 34, of about half the diameter of the equatorial circle.

Turbine rotor space just inside the lower hemisphere above the exit orifice 34 is provided by a short circular cylindrical shell 44 having a diameter equal to that of the orifice circle 34, and a height equal to about 7% of the radius of the equatorial circle 33.

Also inside the lower hemisphere, to assist in focusing the downward flowing air, there is an axially concentric conical lining 46 extending upwardly from the top of the cylindrical shell 44, to a horizontally oriented circle of convenient attachment just below the equatorial circle 33.

Suspended concentrically inside of the orifice 34 of the lower hemisphere by means of four stationary radial vanes, which are shown in FIG. 3 but are omitted from FIGS. 1 and 2 for a purpose of clarity, is a tapered tubular axial structure indicated generally by the numeral 42. This structure has a housing 48 extending downward from the plane of the equatorial circle 33, to the plane defined by the upper end of the cylindrical surface 44. The housing 48 has a lower end diameter and an upper end diameter equal to about 10% and 20% respectively of the diameter of the equatorial circle 33. Extending upwardly for a short distance from the top of the lower hemisphere is a sturdy centering post 76 which will be described further in connection with FIG. 3.

Still referring to FIGS. 1, 2 and 3, it is seen that the plurality of support legs 36 and 38 is comprised of four outer legs 36A, 36B, 36C, 36D, and four inner legs 38A, 38B, 38C, 38D. The upper ends of the four outer legs 36 are connected to the lower hemisphere at attachment points which are respectively spaced 90° apart around the equatorial circle 33. The lower ends of the four outer legs are respectively connected to the corners of a square base 40 on which the entire windmill structure rests. The base 40 can be a metal plate or a concrete structure, etc., as is well known in the art.

The length of the diagonal across the base 90, that is, between the bottom ends of two opposite outer legs, is equal approximately to 1.8 times the diameter of the equatorial circle 33. The slant of the outer legs is characterized by a four to one slope. That is, the slope drops four units for one unit in a radial direction. The height of the exit orifice or circular opening 34 above the ground is therefore equal to approximately 1½ times the diameter of the equatorial circle 33.

The lower ends of the four inner legs 38 are respectively attached to the lower ends of the four outer legs 36. The upper ends of the four inner legs are respectively connected to lugs or attachment points which are spaced 90° apart around the upper end of the tapered housing 48. The four inner legs are also passed through attachment points 88 shown in FIG. 3, near the bottom of the lower hemisphere, 90° apart, around the circle defining the upper end of the short cylindrical surface 44. The center lines of the four inner legs are symmetrical and meet at a common point 23 on the axis of the lower hemisphere and of the axial structure 48 just above the plane of the equatorial circle, along the axis 22 of the structure 48.

The slant of the inner legs is thus characterized by a two to one slope, that is, two units vertically downward to one unit radially outward. The center line of each inner leg lies in a radial plane defined by the axis 22 of the structure and the center line of a corresponding outer leg.

Inside of the lower hemisphere are four radial vanes or plates 50, which are used to hold the tapered axial structure 48 in position. Each of these vanes 50, shown in FIG. 3, may conveniently be a vertical plate attached to the upper end of an outer leg 36A by means of an angle bracket 82A bolted to the vane 50 by means of bolt 84A, and bolted to the hemispherical shell by bolt 86A. These bolts are duplicated at 90° intervals around the lower hemisphere.

The radial vanes 50 are also supported by means of lugs or brackets 52 which are part of the central tapered housing 48 and to which the tops of the inner legs 38 are bolted by means of bolts 56. A small clearance 47 is provided between the edges 50A of the vanes 50 and the structure of the conical shell 46, and between the vane edges 50B and the inner tapered structure 48. At their upper edges, the vanes 50 are in the horizontal equatorial plane 33 of the lower hemisphere 32. With these attachment points, there are additional attachment points for the radial vanes such as to the lugs 54 at the bottom of the axial housing, by means of bolts 56 and corresponding attachment points to the inner legs 38 at points 88A, 88C, etc.

Thus with appropriate attachment points and adequate plate thickness, and a structurally rigid generator housing 48, the overall windmill suspension system strongly resists deflection in the six modes of pitch, roll, yaw, heave, surge, and sway.

Referring to the upper hemisphere or air scoop indicated generally by numeral 16, this comprises a hemispherical shell 20 with its equatorial plane 26 supported concentric with and at a small spacing from the equatorial plane 33 of the lower hemisphere. There is an opening 24 cut on one side of the upper hemisphere 20 which serves as an air scoop when the upper hemisphere is turned so that the opening faces into the wind. The air scoop 20 has a base circle 26 which matches the horizontal equatorial plane 33 of the lower hemisphere. A vertical septum 28 is attached at a number of points inside of the upper hemisphere by means such as indicated using an angle bracket 90A and bolts 92A respectively. The vertical septum, or dividing vane 28 is cut away to form an opening around the upper portion of the generator housing 48 and is attached to vanes or lugs 78 by means of bolts 80 to the upper part of that assembly.

There is a deflection septum 30 which is mounted perpendicular to the vertical divider 28 and is curved so as to deflect the air flow in a manner similar to the inner surface of the back portion of the air scoop. This deflects the inflowing wind as shown by arrows 27 into a downward direction in accordance with arrows 29 and 31, and out of the exit opening 34 in accordance with arrows 35.

The air scoop is a rounded hollow shell rising upwardly from the base circle 26 and forward (upwind) to terminate in a quasi-rectangular wind entrance orifice 24 which is essentially vertical and perpendicular to the vertical septum 28. The exposed area of the wind entrance orifice 24 is approximately 67% of the area of the base circle 26.

The hood 20 is structurally braced by attachments of its internal wall to the curved edge of the vertical septum 28 and to the curved edges of the deflection septum 30.

The upper hemisphere 20 has the same horizontal equatorial diameter as the lower hemisphere 32, and can be mounted in any desired way to rotate coaxially above the lower hemisphere. This can be done in a number of ways, one of which would be to mount the equatorial circle 26 either by means of numerous circumferentially spaced rollers, or equivalently, by means of a circumferential slotted track fitted with numerous slot gripping trolley wheel assemblies.

Referring now to FIG. 3, there is shown the detail of the axial structure 42, including the tapered housing 48 which encloses a conventional electrical generator 70 and a coaxial gear box 68, if necessary, and bearing structure 66 including thrust bearings, and fan shaft 64 supporting the multi-vaned fan having a hub 60 attached to the shaft 64, and a plurality of radial vanes or blades 62. The fan shaft 64 can be extended downwardly to the base 40 to drive another power utilization means.

Additional rotational support of the upper hemisphere utilizes the upper portion of the housing 48 which comprises a post 76 which can serve as a bearing support for bearing 74, which permits the cap 72 to rotate coaxially on the housing 48. As previously explained, the four 90° lugs 78 support the vertical and curving divider vanes 28 and 30 and with them the outer shell 20 of the air scoop. Thus the upper hemisphere can rotate in tracks on the equatorial edge of the lower hemisphere, with good centering provided by the axial post 76 of the axial structure 42.

Any one of a variety of mechanisms can be used to steer the entrance orifice 24 or air scoop head-on into the wind. One of these could simply be a large vertical tail vane, as shown by the dashed outline 98 attached by arm 96 and bolts 97, to the back of the upper hemisphere 20, as an extension of the vertical septum 28. Still another method could be the application of a rotary power to the air scoop in response to the position of the small wind direction indicator, as would be known by a person skilled in the art.

Figure 4:
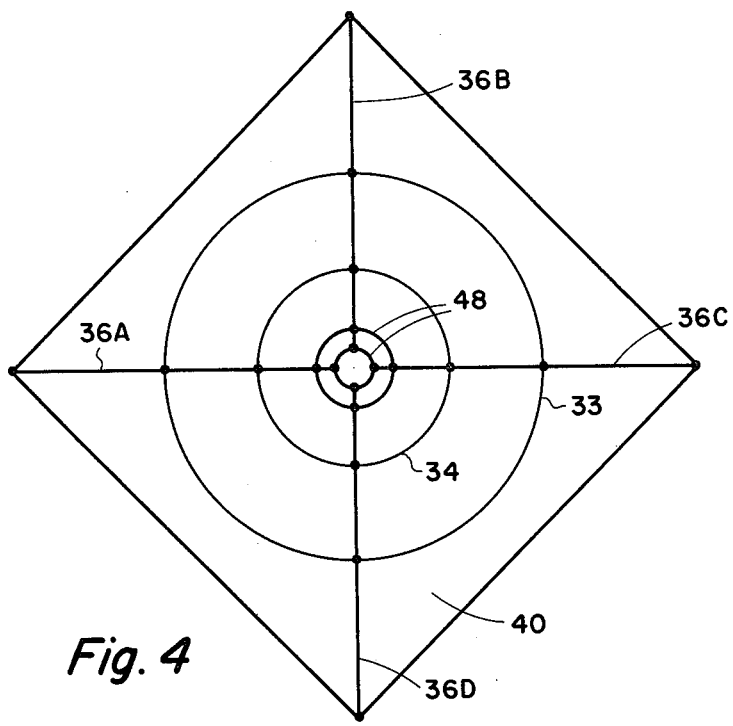
FIGS. 4 and 5 illustrate in line drawing the principal structural features of the invention.
Figure 5:
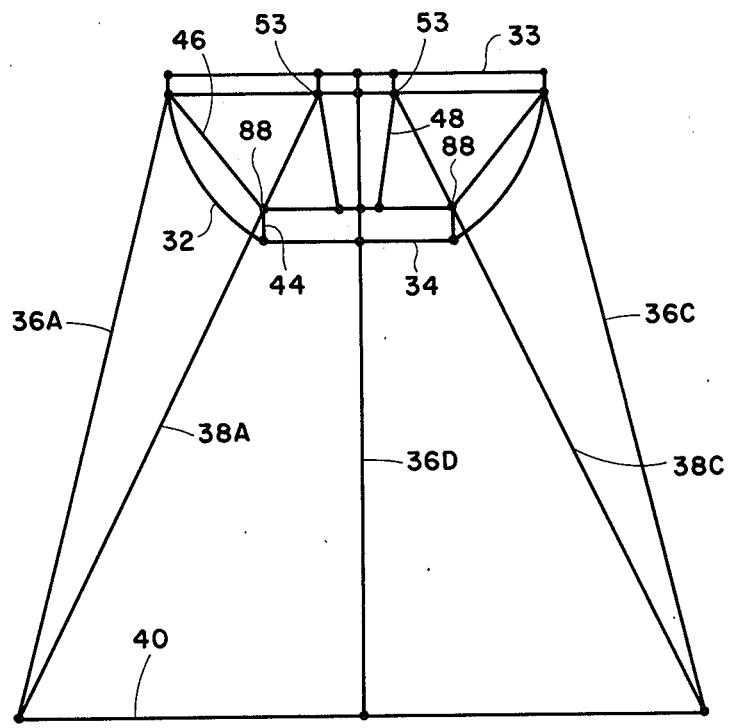

Shown in FIGS. 4 and 5 are two line drawings indicating the principal structural members of the windmill system. The outer legs 36 are supported at the base 40 and at the upper edge of the lower hemisphere. The inner legs 38 are attached to the outer legs at their junction with the base 40 and are supported at points 88 and 53. The radial vanes are supported by attachment to the conical shell 46 and the housing 48. In FIG. 4, the plan view illustrates the symmetrical, coaxial nature of each of the parts of the system.

Many variations of the above described embodiment may be made without departing from the essential nature of this invention. Thus for use in mountain passes and deep gorges where the wind tends to be unidirectional, the air scoop 16 and the lower hemisphere 14 could be fabricated as a single integrated rigid unit. This altered structure could also be used with an upwind-anchored flotation platform in shallow coastal waters.

As another example for hydraulic energy storage, the shaft 64 could be extended downward to a water pumping turbine centered in the base plate of the windmill. Still another modification would be to regulate the output power of the windmill by automatically varying the direction of the steerable air scoop as needed to compensate for varying wind speed. Tripod legs, a flattened air scoop and numerous other variations of shape, structure and application are readily foreseen.

While four pairs of legs are shown, it will be clear, of course, that any number of three or more pairs can be used to provide a stable structure. The use of four pairs of legs is provided for simplicity, and by way of example, and of course, is preferable in view of the use of the legs to support the internal vanes of the lower hemisphere. It is of course clear that the lower hemisphere could have fewer or more than four radial vanes, as desired. Also, there could be more than one curving septum and also more than one vertical septum in the upper hemisphere, to provide more streamlined curvature of the direction of the wind into the scoop and downward across the equatorial plane, and out through the exit orifice, driving the fan or turbine.

A particular advantage of this design is the substantially spherical shape of the outer surface of the windmill structure. This provides for a steerable entrance opening, for the air scoop, a vertically downwardly moving air flow through the fan or turbine and a suction generated across the exit opening by means of the horizontal wind flow across the lower opening, in accordance with the arrows 35.

Figure 6:
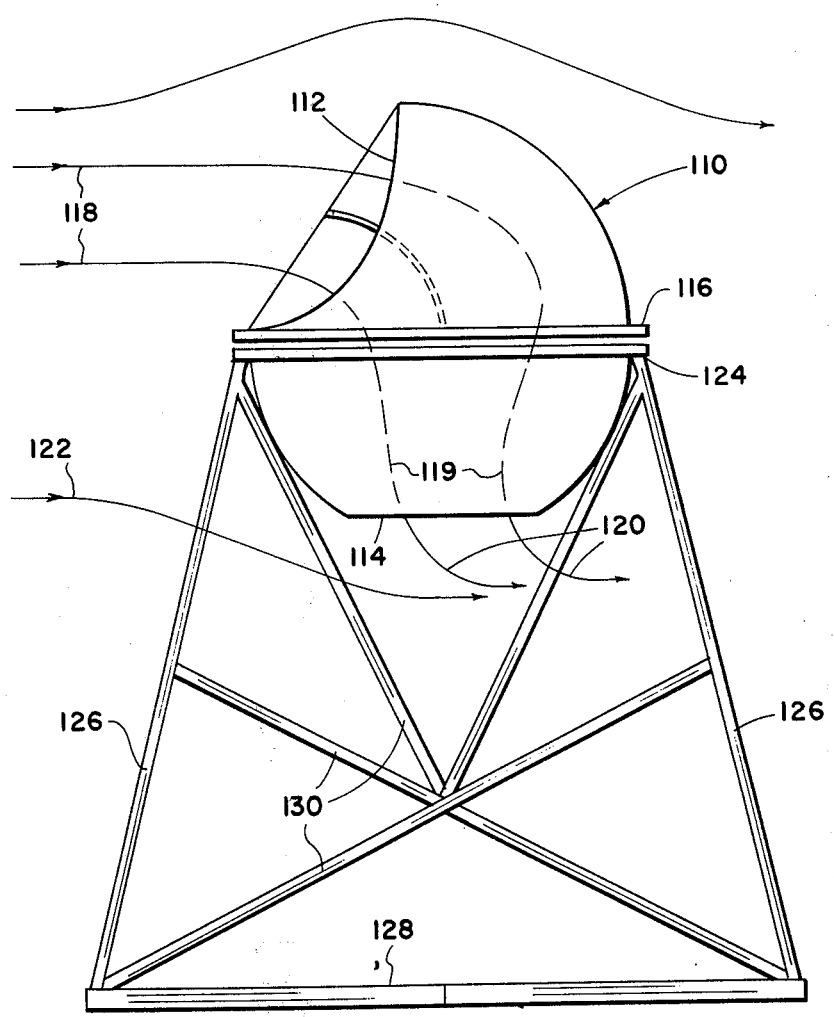

Shown schematically in FIG. 6 is another embodiment useful for unidirectional wind conditions. This design comprises a rigid spherical structure 110 having an equatorial flange 116, by means of which it could be supported on a circular ring 124, supported by legs 126 on a base 128, and braces 130, as required.

The air scoop 112 would receive wind 118 which would flow 119 inside the sphere, across the fan in the exit opening 114, and out 120. The wind 122 flowing across the orifice 114 would generate a suction to enhance the flow of air 119 through the fan and opening 114.

The structure 110 could comprise the two hemispheres 16 and 14 with means to lock the two hemispheres together.

To provide means for directing the air scoop, a pivot could be provided in the center of the base 40.

Or, as shown in FIG. 6 all of the legs of the embodiment of FIG. 1 could be cut off or removed at the surface of the lower hemisphere. The two hemispheres could be bolted together with a circular ring 116 in between and the ring could be supported on a horizontal ring 124 supported on legs 126 etc.

The ring 116 could be locked to ring 124 for fixed directionality. Or appropriate ring bearing means (as is well known in the art) could be used between rings 116, 124 to permit the space 110 to rotate in the frame 124, 126, 128.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A windmill adapted for use in severe climates, comprising:

a central structure supported by a plurality of legs;

a lower hemispheric enclosure supported about its vertical axis by, and encompassing, said central structure, the lower hemisphere being truncated by a horizontal cut exposing a concentric circular exit opening;

an upper hemispheric enclosure rotatably supported about its vertical axis by said central structure and coaxially with and above said lower hemispheric enclosure, the enclosures forming substantially a sphere, the upper enclosure being cut away at one side to expose an entry opening forming an air scoop, air entering the opening flowing downwardly across the equatorial plane and into said lower hemispheric enclosure and out of said exit opening;

a generator supported by said central structure, the generator having a shaft extending coaxially of said enclosure aixs;

and a fan affixed to said shaft at said exit opening.

2. The windmill as in claim 1 including a truncated inverted conical shell lining the inside of said lower hemisphere.

3. The windmill as in claim 1 including a plurality of spaced radial vanes inside said lower hemisphere, supported by and fitting the annular space between said conical shell and said central structure.

4. The windmill as in claim 1 including a short circular cylindrical shell of substantially the same diameter as said circular exit opening and attached at its lower edge to said exit opening, and at its upper edge to the bottom edge of said conical liner.

5. The windmill as in claim 1 in which said plurality of legs comprises four sets of legs, each set comprising an outer and an inner leg separated at the top ends and joined at the bottom ends.

6. The windmill as in claim 5 in which the length of the diagonal between opposite bottom ends of said legs is substantially equal to 1.8 times the diameter of the equatorial plane of said lower hemisphere.

7. The windmill as in claim 5 in which the slope of the outer legs is approximately four units vertical to one unit radial.

8. The windmill as in claim 5 in which the slope of the inner legs is two units vertical to one unit radial.

9. The windmill as in claim 5 in which the height from the plane of the bottom ends of the legs to said exit opening is approximately 1 ¼ times the diameter of said equatorial plane of said lower hemisphere.

10. The windmill as in claim 1, including means to steer said entry opening into the wind.

11. A windmill according to claim 1 including:

a plurality of dividing septa within said upper hemisphere serving to deflect the flow of air entering said entry opening to a downward direction across the equatorial plane into said lower hemisphere.

12. A windmill adapted for use in severe climates comprising:
 (a) a substantially rigid spherical enclosure;
 (b) a part of the upper hemisphere cut away on one side to expose an entry opening forming an air scoop;
 (c) a plurality of dividing septa serving to deflect the flow of air entering said entry opening to a downward direction across the equatorial plane and into the lower hemisphere;
 (d) said lower hemisphere truncated by a horizontal cut exposing a circular exit opening concentric with the axis of said lower hemisphere;
 (e) a central structure coaxial with said lower hemisphere for housing a power utilization means such as planar support plates, an axial shaft supporting a multi-bladed fan at its lower end, said fan parallel to and just above said circular opening;
 (f) a circular flange around said spherical enclosure housing at the equatorial plane thereof, by means of which said spherical enclosure can be supported and
 (g) a horizontal ring adapted to support said horizontal flange, said horizontal ring supported by legs from a base.

13. The windmill as in claim 12 including a ring bearing of substantially the same diameter as and positioned between said equatorial flange and said supporting ring, whereby said spherical enclosure can be rotated while being supported by said ring.

* * * * *